CONDITION RESPONSIVE PULSE GENERATOR

Filed June 1, 1961

INVENTOR
CLIFFORD J. HOFFMAN

BY

ATTORNEY

United States Patent Office 3,171,976

Patented Mar. 2, 1965

3,171,976

CONDITION RESPONSIVE PULSE GENERATOR

Clifford J. Hoffman, Fort Wayne, Ind., assignor to International Business Machines Corporation, New York, N.Y., a corporation of New York Filed June 1, 1961, Ser. No. 114,168
9 Claims. (Cl. 307—88.5)

This invention relates to a pulse generator, and more particularly to a pulse generator which is rendered ineffective upon the occurrence of several error conditions.

Many data processing systems utilize magnetizable tape for the recording and storage of binary information. Many techniques are available for recording binary information on magnetic tape. One such system is the NRZI recording system wherein current through a recording head is held constant during the period in which binary 0's are to be recorded. The direction of the steady current through the recording head is changed whenever a binary 1 is to be recorded.

One means for insuring that a binary 1 is in fact recorded is to cause the generation of an "echo pulse" each time the current through the recording head is reversed. This "echo pulse" is then utilized in the write circuitry as a comparison means to insure that the binary 1 was in fact recorded.

Situations may occur in which an "echo pulse" is generated but the writing of a binary 1 does not in fact take place. Such a situation may be the occurrence of an open or short circuit in the windings of the magnetic recording head. The write circuits may in fact function properly to the point of causing a current reversal but this reversal would then be ineffective at the recording head. Another situation in which an "echo pulse" may be generated but a magnetic recording would not be effected would be the case where the write circuitry furnishes an amount of current to the recording head insufficient to cause a magnetic recording.

It is an object of this invention to provide a circuit for generating a pulse to an output upon the occurrence of a current reversal through an inductance.

Another object of this invention is to provide a circuit which prevents the generation of a pulse in response to a current reversal through an inductance when the inductance has an open circuit.

An additional object of this invention is to provide a pulse generator which is rendered ineffective when a current reversal is applied to an inductance which is short-circuited.

A further object of this invention is to provide a pulse generator which prevents the generation of a pulse whenever an inductance is subjected to a current reversal less than a predetermined amount.

It is also an object of this invention to provide a pulse generator which produces a pulse when current is reversed in an inductance except when the amount of current is below a predetermined level, or the inductance is short-circuited, or the inductance has an open circuit.

These and other objects are achieved in a circuit which includes a translation path between an output means and an inductance to which is applied reversible current source. A level setting means is provided which is effective to set the amount of current which must be presented to the inductance before a pulse will be generated from the output means. A switching means is also provided between the inductance and the translating path for blocking the translation of any pulses along the translating path if an open circuit condition exists in the inductance.

The foregoing and other objects, features and advantages of the invention will be apparent from the following more particular description of a preferred embodiment of the invention, as illustrated in the accompanying drawings.

Figure 1:
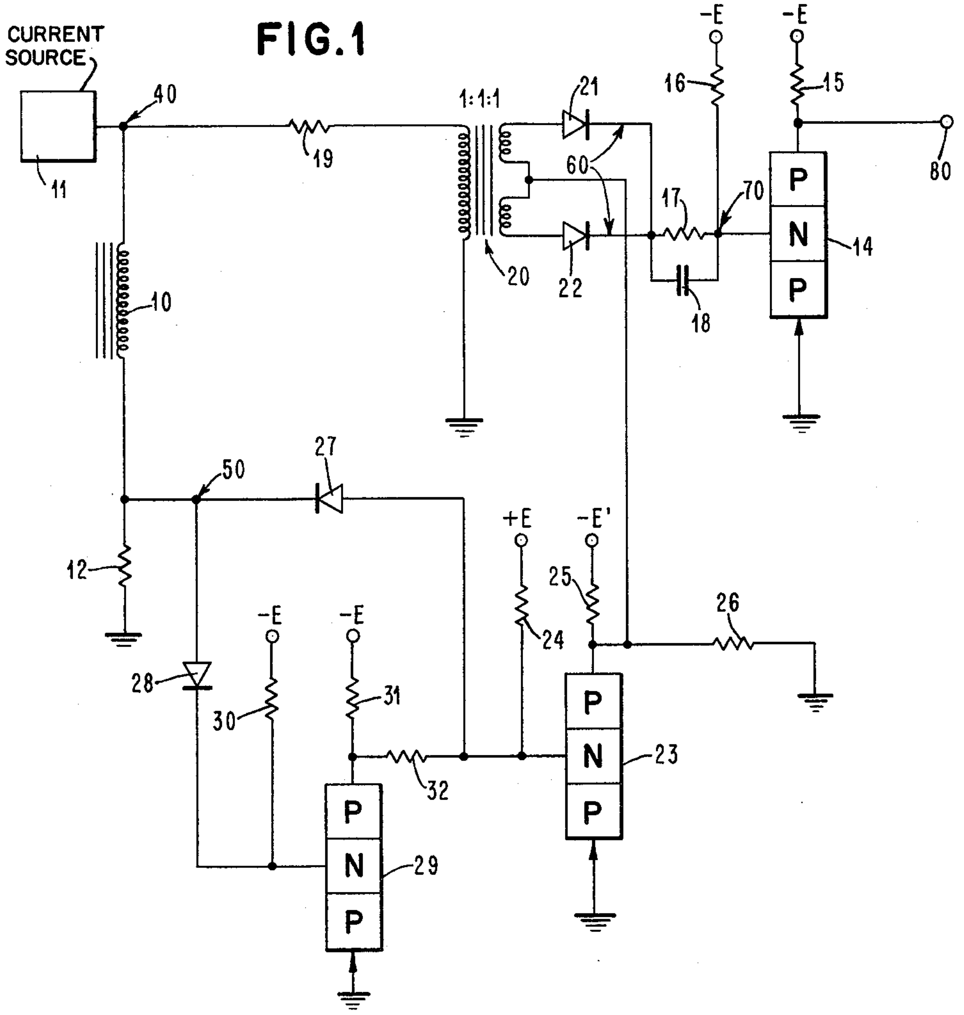
FIG. 1 is a schematic representation of a pulse generating circuit for practicing the instant invention.

In FIG. 1 there is shown a magnetic recording head 10 having an inductive coil for generating flux in accordance with the direction of current therethrough from a current source 11. The current path through the inductance 10 to ground is through an impedance 12. The pulse output of the circuit at terminal 80 is produced by a normally saturated transistor 14 when transistor 14 is rendered non-conductive by a predetermined magnitude pulse. The output at terminal 80 will switch between ground potential at the emitter of transistor 14 to the negative potential at the collector of transistor 14 through resistor 15. A level setting bias is applied to transistor 14 by the negative potential applied to a resistor 16 which is connected to the base of transistor 14. The bias on transistor 14 is also a function of resistor 17 which is in parallel with a capacitor 18.

Under normal operations a translating path is provided for a voltage pulse from the junction of source 11 and inductance 10 through a resistor 19, a phase splitting transformer 20 and rectifying diodes 21 and 22. Transformer 20 and diodes 21 and 22 are included to translate voltage pulses of positive and negative polarity in accordance with a change of current direction through the inductance 10 of either direction.

A biasing means for diodes 21 and 22 is provided through the action of a transistor 23. Under normal operating conditions transistor 23 will be saturated placing ground potential at the plates of diodes 21 and 22 through the low resistance emitter collector path of transistor 23. Under abnormal conditions to be described later, transistor 23 will be rendered non-conductive through the action of a switching means which affects the bias on transistor 23 provided in part by the positive potential and resistor 24 at the base of transistor 23. When transistor 23 is rendered non-conductive, the voltage divider network consisting of the negative potential at the collector of transistor 23 and resistors 25 and 26 place a negative potential at the plate of diodes 21 and 22, reverse biasing these diodes to render them non-conductive to translate pulses therethrough.

The switching means which controls the conductivity of transistor 23 includes a first path, including a diode 27 from resistor 12 to the base of transistor 23. A second path from resistor 12 to the base of transistor 23, in parallel with diode 27, includes a diode 28, and a transistor 29. Transistor 29 is provided with normal bias through the operation of negative potential to the base through a resistor 30 and a negative potential through a resistor 31 to the collector of transistor 29. A resistor 32 is provided to connect the collector of transistor 29 to the base of transistor 23.

Figure 2:
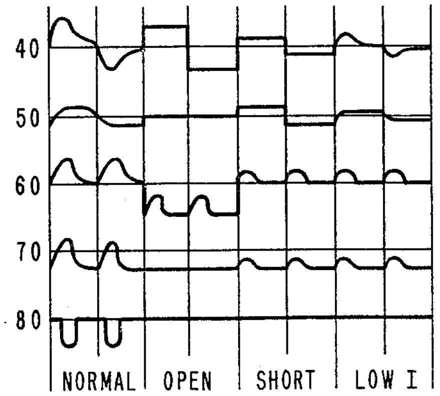
FIG. 2 is a diagrammatic representation of various wave forms found in the circuit of FIG. 1 under various operating conditions.

The operation of the circuit in FIG. 1 may be followed in connection with the wave forms of FIG. 2 which have been designated by reference to various points labeled in FIG. 1. Various operating conditions have also been noted on FIG. 2 to aid in following the operation of FIG. 1.

*Normal operation*

Upon the generation of a positive pulse at 40 for one current reversal from source 11, point 50 will rise to a level slightly above ground through the action of resistor 12. A potential slightly above ground applied to the base of transistor 29 will maintain transistor 29 nonconductive. The slight positive potential at 50 in cooperation with the negative potential at the collector of transistor 29, and through the action of resistors 31 and 32 will produce a negative voltage level at the base of transistor 23 to maintain transistor 23 conductive. As mentioned previously with transistor 23 saturated, the plates of diodes 21 and 22 will have ground potential applied to them and they will be forward biased. The full amount of the voltage swing at 40 will be translated through transformer 20, through the properly phased one of diodes 21 or 22, and will be sufficient at point 70 to overcome the negative bias at point 70. When the bias at point 70 is overcome, transistor 14 will be rendered non-conductive and the potential at 80 will drop to the negative potential at its collector.

When a reversal of current from source 11 takes place, a negative pulse will be generated at 40. Point 50 will follow this voltage swing to a level slightly negative with respect to ground through the action of resistor 12. Transistor 29 will, therefore, be rendered conductive by a negative potential through resistor 30. A negative bias will still be maintained on transistor 23 by reason of the fact that the slightly negative potential at 50 will combine with the ground potential through the low resistance emitter collector path of transistor 29 to maintain the base of transistor 23 slightly more negative than ground potential. As in the previous case, diodes 21 and 22 will be forward biased to translate a pulse therethrough in accordance with the proper phase of pulse produced at 60. Again the proper phased pulse at 60 will be sufficient to overcome the bias at 70 to render transistor 14 non-conductive producing a negative output signal at 80.

*Open circuit condition*

If the inductance 10 should become open-circuited, current will be drawn through resistor 12 and point 50 will immediately go to ground potential. Transistor 29 will immediately be biased into saturation through the operation of a negative potential through resistor 30 at its base. In this situation a positive potential will be applied to the base of transistor 23 through the operation of the positive potential through resistor 24 to ground. When transistor 23 is rendered non-conductive, the voltage divider network consisting of resistors 25 and 26 will place a negative potential at the plates of diodes 21 and 22. Assuming that the current change from source 11 at point 40 would have been sufficient but for the open circuit conditon, transformer 20 would pass a voltage swing which would normally be transmitted through the diodes 21 or 22 to overcome the bias at 70. However, with the plates of diodes 21 and 22 held at a negative potential the effect of the voltage swing at 60 will not be seen at 70 and will not overcome the bias at 70. Since the bias at 70 is not overcome, transistor 14 is maintained conductive holding the output at 80 at ground. The same situation would result upon a reversal in the opposite direction from source 11.

*Short circuit condition*

If the inductance 10 should become short-circuited, the voltage developed at 40 by a proper current swing, and the voltage at 50 will be equal. However, the voltage at 40 will be diminished from that in a normal operation. The proper current through a normal record head generates a voltage at 40 which is dependent upon the impedance of coil 10 and resistor 12. When coil 10 becomes a short circuit, the impedance is reduced. Therefore, the normal proper current will generate a voltage at 40 reduced proportionally to the reduction in impedance. This reduced voltage at 40 and 50 is sufficient to operate transistor 29 as in the case for a normal condition. However, even though transistor 23 remains in a saturated condition holding 60 at ground, resistors 19 and 16 are chosen to have values such that the reduced voltage which would be transmitted through diodes 21 and 22 will not be sufficient to overcome the bias at 70. As in the case of the open circuit condition, even though a pulse is translated through to the output transistor 14, the pulse will not be sufficient to render transistor 14 non-conductive and, therefore, the output will remain at ground potential.

*Low current condition*

Assuming that all circuit conditions are normal, but that current source 11 produces a current reversal having a value less than a predetermined amount, diodes 21 and 22 will remain forward biased but as in the previous condition, resistors 19 and 16 are so chosen that only a current reversal of a predetermined amount will be translated through diodes 21 and 22 to overcome the bias at point 70. As in the short circiut condition, the bias at 70 is not overcome and transistor 14 remains saturated holding the output 80 at ground.

There has been described a simple and reliable circuit arrangement for insuring that an "echo pulse" is generated in a magnetic recording circuit only when all writing conditions are correct. An "echo pulse" will not be generated whenever the windings on the recording head become short-circuited or open-circuited or whenever the writing circuitry provides a recording current less than a predetermined amount to effect a proper recording.

While the invention has been particularly shown and described with reference to a preferred embodiment thereof, it will be understood by those skilled in the art that various changes in form and details may be made therein without departing from the spirit and scope of the invention.

What is claimed is:

1. A condition responsive pulse generator comprising:
a source of current;
an impedance connecting said current source to a reference potential;
pulse producing output means;
pulse translating means connecting said output means to the junction of said impedance and said current source normally responsive to a change in direction of current through said impedance of a predetermined value for producing a pulse from said output means;
and means connecting the junction of said impedance and the reference potential to said pulse translating means effective when said impedance has an open circuit condition for blocking the translation of a pulse by said translating means to said output means.

2. A condition responsive pulse generator comprising:
a source of current;
an inductance connecting said current source to a reference potential;
pulse producing output means;
pulse translating means connecting said output means to the junction of said inductance and said current source normally responsive to a change in direction of current through said inductance of a predetermined value for producing a pulse from said output means;
and means connecting the junction of said inductance and the reference potential to said pulse translating means effective when said inductance has an open circuit condition for blocking the translation of a pulse by said translating means to said output means.

3. A condition responsive pulse generator comprising:
an inductance connected between a source of current and a reference potential;
output means;
means for translating to said output means a voltage pulse from the current source or a voltage pulse induced in said inductance by a change in current therethrough from the source;
level setting means connected to said output means and said translating means operative to prevent an output from said output means if said translated pulse is not of a predetermined amplitude;

and means connecting said translating means to the junction of said inductance and the reference potential, operative when an open circuit exists in said inductance, for rendering said translating means ineffective to translate pulses to said output means.

4. A condition responsive pulse generator comprising:

an inductance connected between a source of current and a reference potential;

output means;

means including a unidirectionally conductive device for translating to said output means a voltage pulse from the current source or a voltage pulse induced in said inductance by a change in current therethrough from the source;

level setting means connected to said output means and said translating means operative to prevent an output from said output means if said translated pulse is not of a predetermined amplitude;

and means connecting said unidirectionally conductive device to the junction of said inductance and the reference potential, operative when an open circuit exists in said inductance, for biasing said device to be non-conductive, whereby said translating means is rendered ineffective to translate pulses to said output means.

5. A condition responsive pulse generator comprising:

an inductance connected between a source of current and a reference potential;

output means;

means for translating to said output means a voltage pulse from the current source or a voltage pulse induced in said inductance by a change in current therethrough from the source;

level setting means connected to said output means and said translating means operative to prevent an output from said output means if said translated pulse is not of a predetermined amplitude;

impedance means in the connecting means between said inductance and the reference potential;

and means connecting said translating means to the junction of said inductance and said impedance means, operative when current flow through said inductance ceases, for rendering said translating means ineffective to translate pulses.

6. A condition responsive pulse generator comprising:

an inductance connected between a source of current and a reference potential;

output means;

means including a unidirectionally conductive device for translating to said output means a voltage pulse from the current source or a voltage pulse induced in said inductance by a change in current therethrough from the source;

level setting means connected to said output means and said translating means operative to prevent an output from said output means if said translated pulse is not of a predetermined amplitude;

impedance means in the connecting means between said inductance and the reference potential;

and switching means connecting said unidirectionally conductive device to the junction of said inductance and said impedance means, operative when current flow through said inductance ceases for biasing said device to be non-conductive, whereby said translating means is rendered ineffective to translate pulses.

7. A condition responsive pulse generator comprising:

an inductance connected between a source of current and a reference potential;

output means;

means including a unidirectionally conductive device for translating to said output means a voltage pulse from the current source or a voltage pulse induced in said inductance by a change in current therethrough from the source;

level setting means connected to said output means and said translating means operative to prevent an output from said output means if said translated pulse is not of a predetermined amplitude;

impedance means in the connecting means between said inductance and the reference potential;

means normally biasing said unidirectional device to be conductive;

and switching means connecting said biasing means to the junction of said inductance and said impedance means, operative when current flow through said inductance ceases for reversing the bias on said unidirectionally conductive device to render it nonconductive, whereby said translating means is rendered ineffective to translate pulses.

8. A pulse generator in accordance with claim 7 wherein said biasing means includes:

a normally conductive transistor which is rendered nonconductive by said switching means to reverse bias said unidirectionally conductive device.

9. A pulse generator in accordance with claim 7 wherein said switching means includes:

a first circuit path including a diode;

and a second parallel circuit path including a transistor, said first and second paths operative in response to current through said inductance in either direction to maintain said biasing means effective to maintain said unidirectionally conductive device conductive, and operative in response to cessation of current through said inductance to cause said biasing means to reverse bias said device.

References Cited in the file of this patent

UNITED STATES PATENTS

| | | |
|---|---|---|
| 2,977,485 | Olsen | Mar. 28, 1961 |
| 3,002,110 | Hamilton | Sept. 26, 1961 |